United States Patent [19]
Wertsberger

[11] Patent Number: 6,072,600
[45] Date of Patent: Jun. 6, 2000

[54] FACSIMILE CAMERA DEVICE

[76] Inventor: Shalom Wertsberger, 30 Fern La., South Portland, Me. 04106

[21] Appl. No.: 08/789,816

[22] Filed: Jan. 28, 1997

Related U.S. Application Data

[60] Provisional application No. 60/010,833, Jan. 30, 1996.
[51] Int. Cl.[7] .............. H04N 1/00; H04N 1/04; H04N 5/225
[52] U.S. Cl. .......... 358/479; 358/400; 358/906; 358/909.1; D14/118; D16/229
[58] Field of Search .............. 348/211, 552, 348/273–275, 336, 333, 231, 371, 376, 212, 213, 14, 15, 17; 379/100.01, 100.02; 455/557; 396/419, 428; 358/479, 906, 909.1, 408, 481, 400; 382/284; D16/214, 220, 229, 244; D14/118

[56] References Cited

U.S. PATENT DOCUMENTS

| | | |
|---|---|---|
| 4,926,249 | 5/1990 | Ichihara et al. .............. 358/75 |
| 4,939,580 | 7/1990 | Ishikawa et al. .............. 358/229 |
| 5,003,398 | 3/1991 | Suzuki . |
| 5,077,612 | 12/1991 | Mergrgardt . |
| 5,193,012 | 3/1993 | Schmidt . |
| 5,235,432 | 8/1993 | Creedon et al. . |
| 5,587,735 | 12/1996 | Ishida et al. .............. 348/14 |
| 5,619,257 | 4/1997 | Reele et al. .............. 348/64 |
| 5,666,159 | 9/1997 | Parulski et al. .............. 348/211 |
| 5,917,553 | 6/1999 | Honey et al. .............. 348/578 |

*Primary Examiner*—Kimberly A. Williams
*Attorney, Agent, or Firm*—Saltamar Innovations

[57] ABSTRACT

A portable, compact Fax Camera Device comprised of a still electronic camera circuitry and an image sensor especially adapted for facsimile, with integrated facsimile communication device, this invention is designed and built specifically for the acquisition and communication of facsimile images in such aspects as resolution, aspect ratios, optical design, mounting capability, tight integration of facsimile circuitry, and capability of receiving facsimile images. The Fax Camera allows easy capturing of fax images from books without the need for photocopying, easy photography type capture of real world objects, as well as convenient regular page image capture and transmission. For regular page and book images, the invention is equipped with collapsible mounting device constructed to allow easy and accurate focus and provides a frame for predetermined size documents. The invention also includes a display device to allow viewing and editing of captured fax images. The tight integration of still electronic photography and facsimile communication capabilities create a light, portable, and flexible fax communication device.

16 Claims, 7 Drawing Sheets

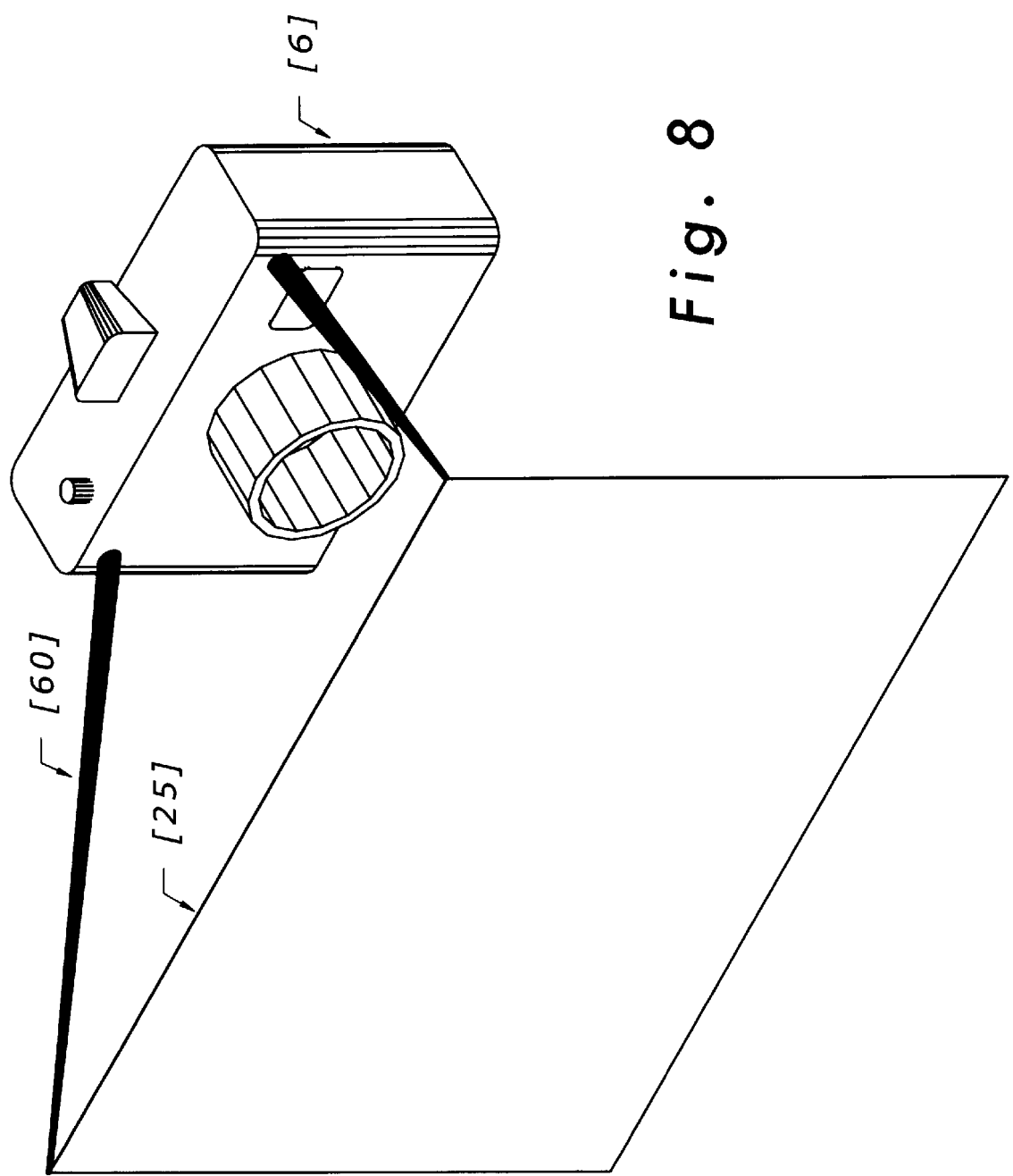

FACSIMILE CAMERA DEVICE

RELATED APPLICATION

This application claims the benefit of U.S. provisional application Ser. No. 60/010,833 filled Jan. 30, 1996.

FIELD OF THE INVENTION

The invention relates to facsimile equipment in general and more particularly to a electronic still camera constructed and adapted for facsimile image capture, storage and transmission.

BACKGROUND OF INVENTION

Facsimile (popularly known as fax) equipment has become a common method of relaying information in today's business world. Most fax machines built today fall into one of two major groups: computer based and standalone fax machines. Computer based technology can be as compact and versatile as the computer equipment itself. In terms of usability as fax equipment it can send most computer files designed to be printed on any printer. However in order for the computer to send images that were not originally generated by the computer, the image has to be scanned, digitized, or otherwise converted to a computer readable form. This necessitates additional scanning equipment whenever external printed or photographed material is to be transmitted by fax.

Dedicated standalone fax machines are for the most part built around a static line image capture element that requires the image to be printed on paper that is then transported through the fax machine. During this process, a static line image capture element senses the image and transmits it to the receiving fax machine, or saves it for later transmission. Most standalone fax machines can feed only single pages of paper, of standard dimensions such as US letter and legal size paper or ISO A4 size paper. If the material to be transmitted is from a book or of non standard dimensions, the user must first photocopy the image onto a single sheet of paper of the proper dimensions, and only then use the fax machine to transmit the picture. Additionally, if a picture of real world objects is to be transmitted, the object needs to be photographed and then the photograph needs to be transmitted to paper or computer readable form before it can be transmitted via a regular standalone fax machine or a computer based fax device.

Additionally, standalone fax machines are relatively large and bulky, thus limiting their portability. Light, portable fax equipment can find many uses particularly by traveling business people.

Still video photography allows capture of images of varying formats and seem to be a perfect fit for the problems of varying sources of the image. Still video can also be made highly portable. There are various implementations of still video equipment commonly available from companies like Kodak, Sony and Canon, and various aspects of the art are disclosed in numerous US patents and other publications. Methods of improving still video performance were described in detail in U.S. Pat. No. 5,003,398 (Suzuki, Mar. 26, 1991) and methods of storing image data in non volatile memory were described in U.S. Pat. No. 5,077,612 (Megrgardt et al., Dec. 31, 1991). Still video photography equipment, however, is designed and geared towards high resolution color photography, primarily for display on television or a computer monitor. Most current still video camera units call for 24 bit color resolution at a different aspect ratio and different resolution than that required by facsimile standards such as ITU T.4.

There are in existence such methods as described by U.S. Pat. No. 5,193,012 (Schmidt, Mar 9, 1993) to convert real time output of a still video camera signals to a fax compatible output, and same disclosure describes various devices such as the Image Data Corporation PhotoPhone, and other devices and methods for transmitting captured video images or for translation and conversion of video images into fax compatible form. Similarly, U.S. Pat. No. 5,235,432 (Creedon et al., Aug. 10, 1993) teaches a method for converting video signals to facsimile signal. These former disclosures dictate the use of an interim device or method to convert from common, television oriented video output to fax compatible format, mostly as an adaptation of an existing still video camera. Those attempts show the need for generating fax signals from a still video-like device, however, the starting point of those former devices is the common, television oriented video signal. The above described methods call for interpolation of the video data. When applied to a page of written material for example, this interpolation process may cause loss of clarity of the printed data.

Therefor there is a clear need for a fax equipment device, designed specifically as facsimile equipment, comprising an image capturing device designed specifically to standard facsimile resolution and aspect ratio, with fax transmitting capability directly integrated with the device, and proper mounting and focusing equipment that will make the device easily usable as a light portable fax camera.

SUMMARY OF THE INVENTION

It is an object of this invention to provide a light, portable fax camera device to satisfy the needs described above. The invention aim is for a portable device capable of easy capture of images of regular (e.g. US letter size or ISA A4 size) sheets of paper or documents for transmission as fax. It is also an object of this invention to allow capturing of image data from sources other than regular documents such as books, magazines, etc. without reproduction of the above images to a sheet of paper, prior to transmission of that image to a remote fax machine. Additionally, it is an object of this invention to allow photography, in a manner similar to regular photography, of any object whereby the image of the photographed object may be transmitted as fax without the need for film, or the need to print the photograph, or transfer the photograph to a computer, or video tape recorder or any similar intermediate steps.

It is also an object of the current invention to allow reception of incoming fax messages and store them for viewing, retransmitting, or printing using external printer.

The current invention, hereafter the Fax Camera, describes an electronic still camera-like device coupled with fax transmission circuitry, and supporting circuitry. The Image Capture Device [1] is constructed of one or more CCD (Charge Coupled Device) planar image sensors, constructed with a resolution, color resolution, aspect ratio, and other aspects, essentially similar to the image aspects requirements of fax standards such as ITU T.4 or any other applicable fax standard.

The Image Capture Element[1] captures the image projected upon it by a lens system[3]. The output of the image capture element is converted to digital signals by an Analog to Digital (A/D) circuitry[9] and stored in Memory[11]. The stored image may then be transmitted via the coupled fax modem circuitry[13] to a remote fax machine, or transferred to a computer or printer via a Data Communication Port [21], or a storage device[20].

The most common images sent by fax today are images of letter size paper documents. To best fit the Fax Camera for that purpose, the invention is provided with Mounting Support[19], attached to and collapsible toward or into the fax camera enclosure[6]. The Mounting Support is constructed to allow the camera to face a surface where a sheet of paper may be placed for image capture, as a preparation for transmission. The Mounting Support also assists the user in proper placement and alignment of the paper documents to be faxed. The ends of the Mounting Support[19] create a virtual frame[25] of the proper size, e.g. ITU A4 size, indicating proper document placement. Additionally, to further facilitate capturing documents, the Lens System is constructed with a preset position. When the Lens System is set to that position, the lens is best focused to capture an image placed in the plane of, and inside the virtual frame[25] created by the Mounting Support. Images from books, or other paper or essentially flat images are taken similarly, whereby the virtual frame[25] provides an easy reference as to the size of the captured image. Other methods of placing an image at predetermined distance are off-course possible, and two of them are depicted in FIG. 7 and FIG. 8.

The optical system is constructed in a manner that allows minimal distortion of a flat image when the image placed in the Virtual Frame[25]. This may be achieved by proper optical design where the periphery of the lens field of view is not used for image capture, or by placement of special geometry lens elements into the optical system.

In order to facilitate data entry the Fax Camera incorporates an input device [14] such as a keypad to allow manual entry of telephone numbers and other pertinent data. The Fax Camera may also incorporate a display device, such as an LCD (Liquid Crystal Display) display, to allow the user to view and edit image data, display incoming fax images, and program and control the Fax Camera operation.

Other conveniences such as a flash lighting device, an automatic focus mechanism, automatic exposure mechanism and others described below may be added to the Fax Camera to enhance usability.

These and other aspects of the invention will be apparent from the following description of the invention.

GENERAL DESCRIPTION OF DRAWINGS

Figure 1:
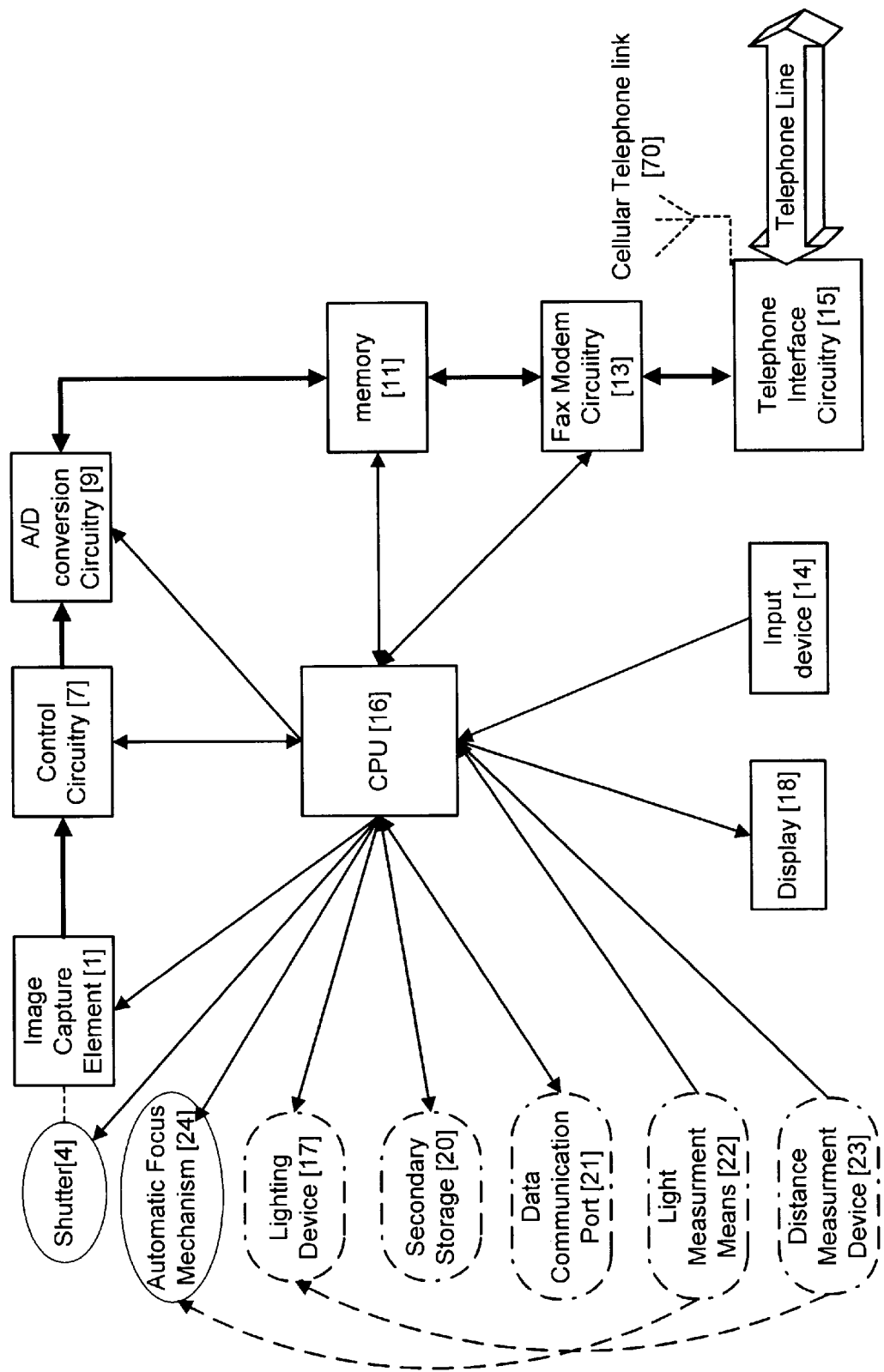
FIG. 1 is a block diagram of the invention, showing data and control flow.
Figure 2:
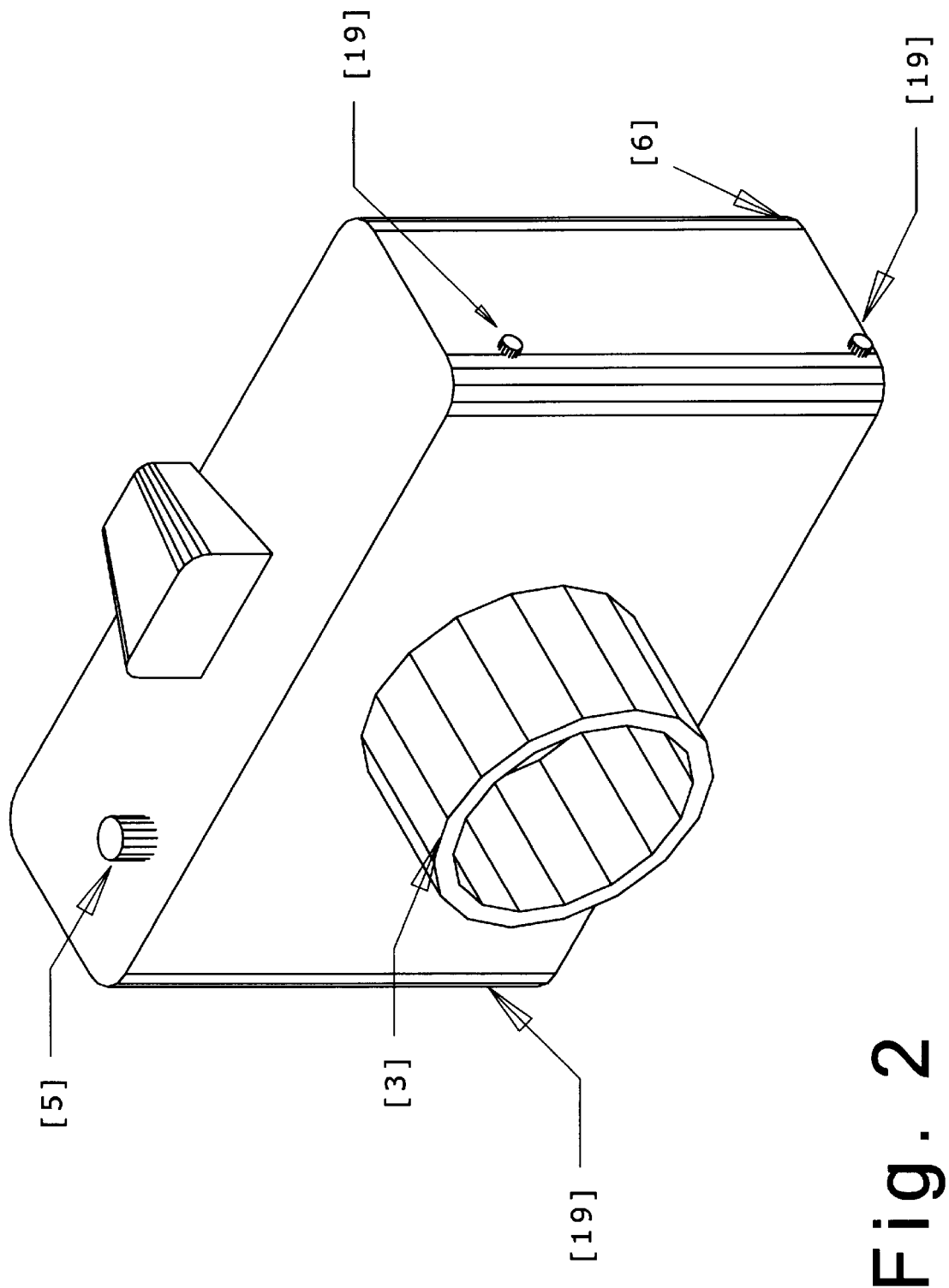
FIG. 2 is a perspective physical illustration of the invention
Figure 3:
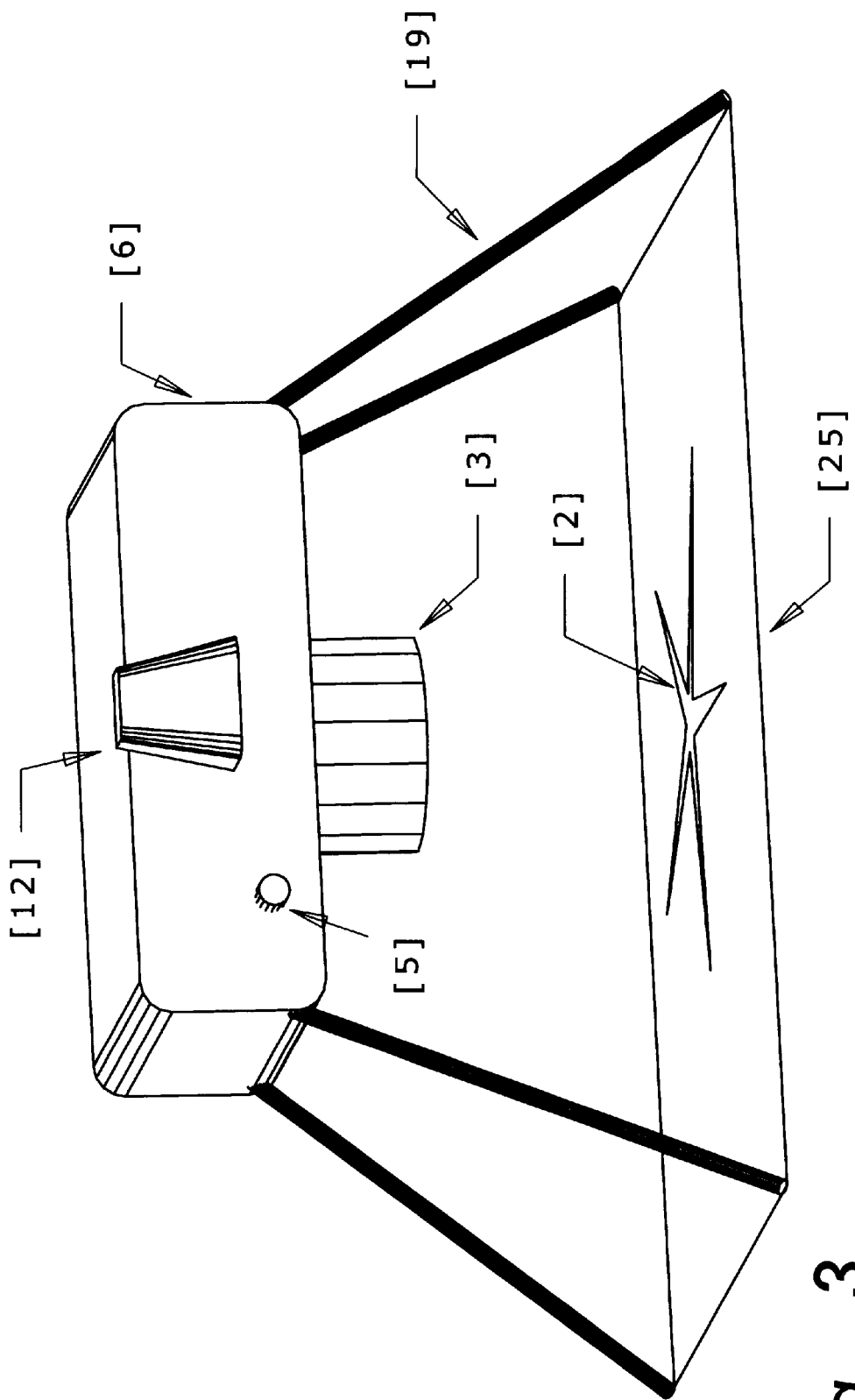
FIG. 3 is a physical illustration of the device showing the Mounting Support [19] extended, and the invention ready to acquire an image[2].
Figure 4:
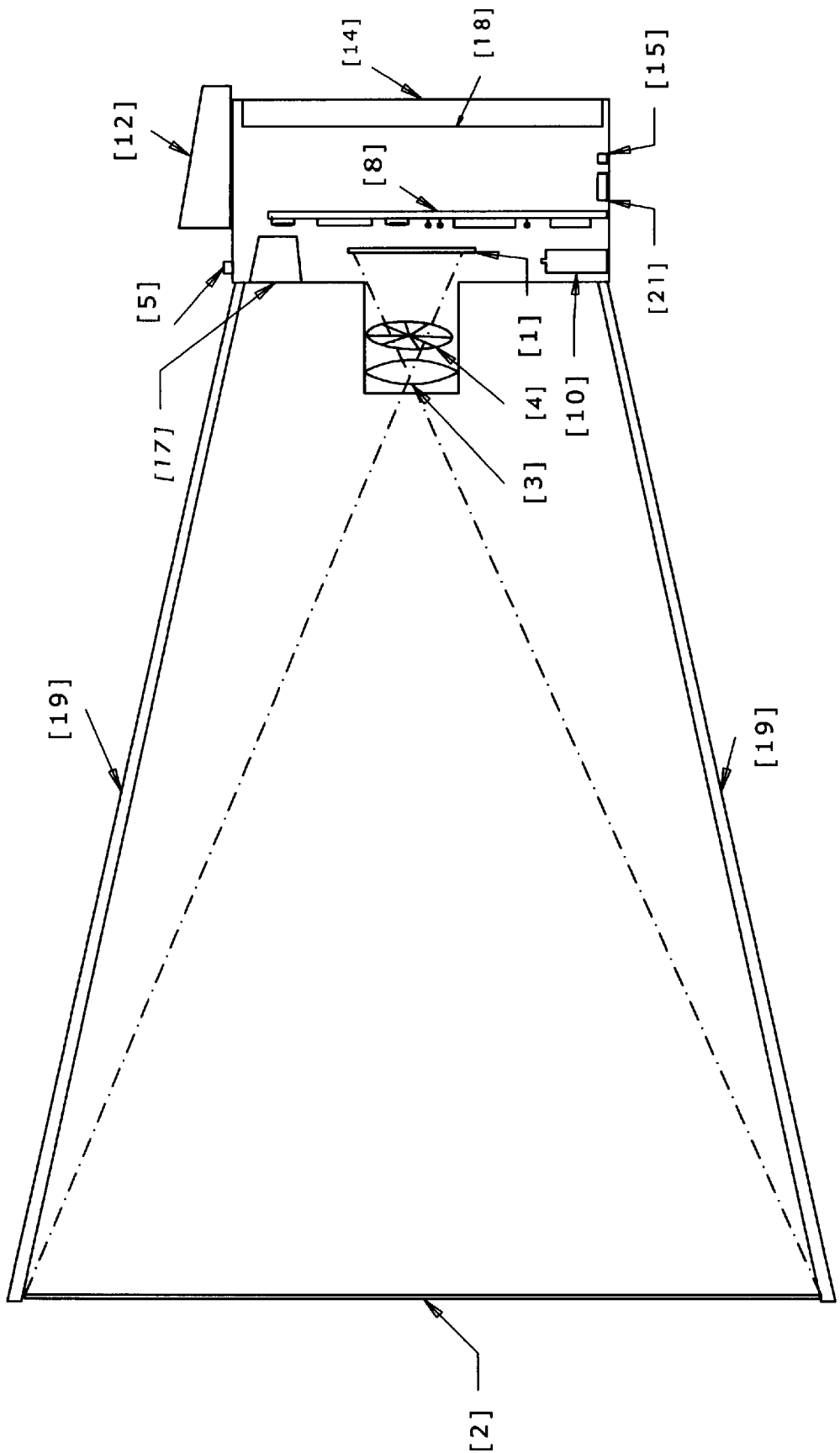
FIG. 4 depicts the optical principle of the invention.

FIG. 8 presents another alternative method for placement of a sheet of paper at proper distance for full page image capture.

PREFERRED EMBODIMENT OF THE INVENTION

Electrical Construction

The preferred embodiment will utilize a special monochrome frame transfer CCD image sensor with a pixel resolution of substantially 1728×2287 or somewhat larger, as the Image Capture element [1]. (It should be noted that smaller resolutions are both supported by ITU standards, and that electronic manipulation can easily provide for lower resolution. Similarly, a smaller pixel count may be used to allow for unprintable edges of image. It is however desirable to maintain an aspect ratio substantially similar to 1728× 2287 pixels.) Thus the Image Capture Element[1] support at least a one to one correlation between Image Capture element pixels and T.4 pels, at a resolution of 7.7 lines/ millimeter on an A4 sheet of paper. The Image Capture Element [1] is placed so that light reflected from the image [2] passes through the optical Lens System[3] and hits the Image Capture Element[1].

A solenoid operated shutter device[4] is placed between the Image Capture Element[1] and the Lens System[3] to allow the Image Capture Element [1] to stay dark between image acquisition cycles. The shutter device solenoid is operated under the control of the CPU[16].

A Trigger [5] operates a switch that indicates to the CPU[16] to begin an image capture cycle. In an alternative implementation, the trigger function may be initiated by a remote control device.

The Image Capture Element [1] is connected to and accepts control and timing signals from the Control Circuitry [7]. The control circuitry provides timing and control signals required by the Image Capture Element [1] as well as conditioning, anti blooming, 'black' current handling, and amplification of the image signal output of the Image Capture Element [1] to a level and format appropriate to provide image data to the A/D Conversion Circuitry [9]. The Control Circuitry[7] is made similar in design and components to current still video and camcorder designs, but with timing conformant to the characteristics of the Image Capture Element [1] employed. The reader is referred to standard literature and to manufacturer literature such as Texas Instruments Area Array Image Sensor Products catalog from 1994 for control circuitry reference. Obviously specific timing, rows, column and voltage variables should be modified as dictated by the details of the Image Capture Element CCD.

The A/D conversion circuitry[9] is built to accept the image data and synchronization (sampling) signals from the Control Circuitry[7] and transforms the image data into digital data suitable for storage in Memory Means [11].

The A/D Conversion Circuitry is built to accept image signal from the separate pixels of Image Capture Element [1] and sampling synchronization signals from the control circuitry, and transform the image data into a level similar for digital processing. The conversion performed by the A/D Conversion Circuitry[9] is a simple bi-level conversion, representing each pixel as a single bit value of 1 or 0.

Fax Modem Circuitry[13] is commonly available from manufacturers such as Rockwell, Cirrus Logic, Yamaha, and others. The Fax Modem Circuitry[13] is built and connected in a manner that allows the CPU to control its operation, i.e. to send and receive data and status information to the Fax Modem[13] and to send commands to initiate a fax session with a remote unit, transmit a fax image from memory[11], or receive a fax from a remote fax machine and store it in memory.

The Fax Modem Circuitry[13] is connected to Telephone Interface Circuitry [15] that allows the Fax Camera to connect to a public switched telephone network, or a cellular telephone communication link. Additionally, cellular telephone circuitry[70] may be built into the fax camera to provide self contained communications capability.

The CPU [16] is also connected to an Input Device[14] and to an LCD Display Device to allow entry of user commands, telephone numbers, etc. The input device[14] in the preferred embodiment is implemented as a touch sensitive screen placed over an LCD Display Device[18] and utilizes the LCD Display Device under the CPU[16] control to provide labeling of the appropriate function of the input device. The LCD Display Device[18] is connected to the CPU[16] and is capable of displaying text and graphics. The Display Device[18] is also utilized to display captured or received images or parts thereof. It is also used to facilitate entering alphanumeric data to be included in the sent facsimile image, to display pertinent status information, or to facilitate programming the Fax Camera operation.

Power for the operation of the Fax Camera is provided by an internal battery[10]. The battery may be rechargeable type or non rechargeable type.

A PCMCIA device interface is built into the Fax Camera Device in the preferred implementation, to allow storage of image into a PCMCIA secondary storage device constructed of FLASH-ROM[20] or magnetic storage disk.

A Lighting Device [17], such as a photographic flash is controlled by the CPU[16] to facilitate image capturing at low ambient light levels, and provide consistent and predictable lighting for page image capturing.

An embedded Data Communications Port [21], such as an IEEE RS-232 conformant serial port is embedded in the preferred implementation of the Fax Camera to allow direct communication between the Fax Camera and a computer or a printer.

Physical Construction

The preferred implementation of the Fax Camera Device is fitted into a housing[6], similar to commercially available common cameras.

Four telescoping legs, comprising the Mounting Support [19], are attached to the Housing[6], constructed to extend and pivot from the housing[6] and to mechanically lock in the extended position to provide mounting support that places the fax camera at a predetermined distance from the photographed image[2]. The Mounting Support is constructed so that when extended and resting against a mounting surface such as a table, it creates a virtual frame[25] defined by the contact points of the support legs with the supporting surface. The virtual frame[25] is of a size equivalent or slightly greater than the size of ITU A4 paper sheet. The frame distance from the Enclosure[6] is computed or experimentally determined, so that if the Lens System[3] is placed at the page image acquisition preset position, the Lens System[3] is focused on the virtual frame[25] plan, with the frame essentially filling its field of view, allowing minimal distortion, full page capture, and best focus of acquired document image.

The Lens System [3] is placed in the front side of the Housing[6] and is constructed to allow focusing an Image [2] reflection on the Image Capture Element [1]. The Lens System [3] is also constructed with a Page Image Acquisition preset position to allow easy focus, for optimal capture of a full A4 or US Letter size page when such a page is placed in the virtual frame[25] defined by the ends of Mounting Support [19]. The Lens System[3] is also constructed to allow continuous focusing on any object at variable distances from the Fax Camera. In this embodiment the Lens System[3] is detachable from the housing[6], to allow mounting of different type of lenses. The Lens System [3] also includes an iris device to provide aperture control.

A shutter Device [4] is placed in the light path between the Lens System[3] and the Image Capture Device[1].

Electronic circuitry is placed on one or more Printed Circuit Boards[8], and housed inside the camera enclosure.

A Display Device[18] and a touch sensitive screen used as Input Device[14] are placed at the back of the housing. The Input Device is placed on top of the Display Device[18], so that the Display Device may be utilized as a background for the transparent Input Device[14].

A Trigger Button[5] is placed on top of the Fax Camera. The trigger is constructed to close a switch and provides, when depressed, a signal to the CPU[1] to begin the image acquiring cycle. The trigger may be operated remotely by mechanical means, such as a cable, to reduce movement of the Fax Camera during image capture.

Operation of the Invention

The Fax Camera may acquire an image in one of two modes: Page Image Acquisition mode or Variable Distance mode. The difference between the two modes is primarily in the focusing stage of operation.

In the Page Image Acquisition mode the user extends the support means [19] and pivot the telescoping legs to form a four legged support. When fully extended, the legs form a virtual frame[25] rectangle similar in size to an ITU A4 page. The user then places the object to be transmitted between the support legs. The user also places the Lens System[3] in its Page Image Acquisition mode preset position.

In Variable Focus Mode, the user points the Fax Camera at the image to be captured, and uses an optical focus mechanism to set the focus of the Lens System[3]. The support means[19] may or may not be used while operating in this mode.

From here on the operation of the invention is similar in the Page Image Acquisition mode and the Variable Distance mode.

The user then presses the trigger[5], thus initiating the image scan. The CPU[16], upon receiving of the electrical signal from the Trigger[5], commands the control circuitry [7] to clear any charges in the Image Capture Element and prepare the element for image acquisition. Once the Image Capture Element[1] is ready to receive image data, the CPU [16] activates the shutter device[4], and if desired, the lighting device[17]. Once a time period sufficient for the Image Capture Element[1] to capture the image has elapsed, the shutter device[4] has completed its operation, and the CPU initiates a command to the Control Circuitry[7] to scan the data from the Image Capture Element[1] and transfer it to the A/D Conversion Circuitry[9]. The A/D Conversion Circuitry[9] converts each pixel to logic level bit, and transfer the data to the CPU[16]. The CPU then compress the data according to the method described in ITU standard T.4 and stores it in memory[11]. Once the data is stored in memory[11], the image capture is complete.

In an alternative embodiment the image data may be first stored in Memory[11] using the CPU[16] or direct memory access, and later compressed and stored back in Memory [11]. In yet another alternative embodiment, the image data is stored uncompressed, and the image data is compressed only before or during fax sending operation.

When the captured image is to be transmitted, the fax camera is attached to a telephone line via the Telephone Interface Circuitry[15]. The operator utilizes the input device[14] to enter a telephone number (or use a number previously stored in memory) and initiate the fax transmission. The CPU [16] then instructs the Fax Modem Circuitry [13] to initiate the call, and negotiate with the remote fax machine according to standard communication specifications (e.g. ITU T.30). The CPU[16] then transfers the image data to the Fax Modem Circuitry[13] that transmits the data to the remote fax receiver.

The device may also be attached to a telephone line to receive fax data. The Fax Modem Circuitry transfers the received fax data to memory[11] and the display device[18] is utilized to display the incoming fax as a whole or in parts.

Utilizing the input device, a user may transfer image data, captured or received, to a printer utilizing the Data Communications Port[21], or transfer image data to Secondary Storage[20]. The user may also add text to the stored image by entering the text on the Input Device[14]. The usage, in this embodiment, of a touch sensitive screen as the Input Device [14] allows the user to enter direct graphical data such as handwriting or diagrams. Such input will be done using 'pen' technology as is well known in the art (e.g. Apple Computers Newton). Such user entered data may constitute the fax image, added to a fax image or be superimposed on a captured or received image.

Note that a number of images may be stored in memory, the exact number depending on the amount of memory installed in the fax camera device and the complexity of the stored images.

Alternative Embodiments

Figure 5:
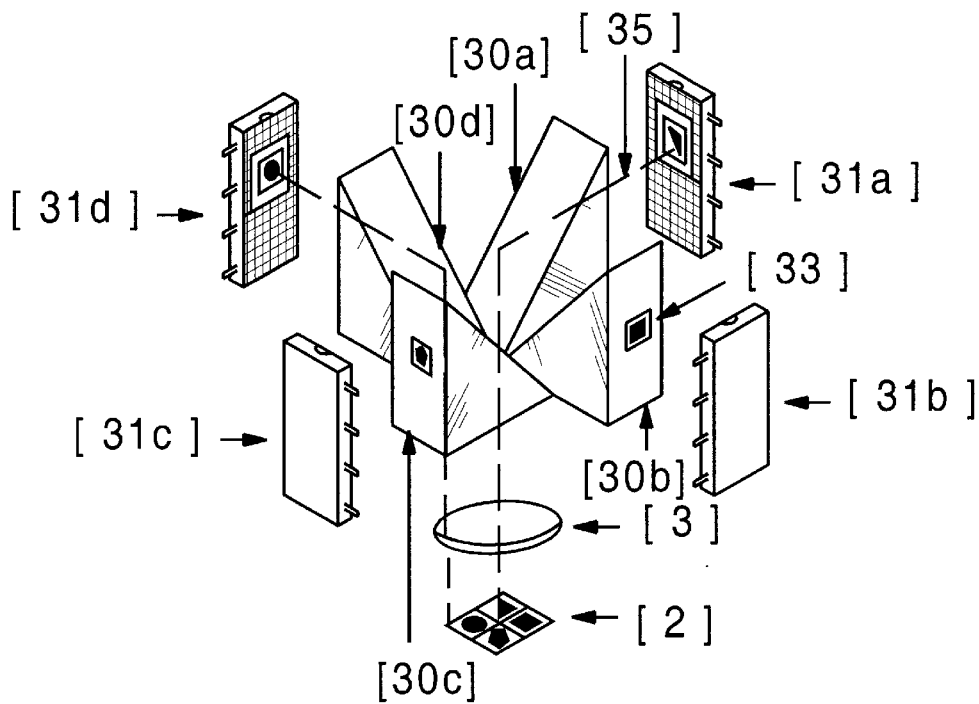
FIG. 5 depict an alternative method for implementing the Image Capture Element[1]

While the ideal Image Capture Element[1] is a single CCD of appropriate resolution, the Image Capture Element may be implemented by many methods, such as:

Multiple, CCD Image Sensors[30], each with resolution lower than that needed for a full page scan, arranged to provide each element with a portion of the image. When combined, the images from the separate Image Sensors create an image data set similar in resolution and aspect ratio to the single Image Capture Element[1] described above. An example of such a split sensor device is depicted in FIG. 5. The optical splitter divides the image projected by the Lens System[3] into four quadrants. The splitter is constructed of four right angle prisms [30a, 30b, 30c, and 30d] placed so that the base faces of the prisms facing the Lens System[3] are placed in close proximity to one another in a single plane perpendicular to the axis of the Lens System[3]. Thus each prism receive only a single quadrant of the projected image. Reflected light from the image[2] passes through the Lens System[35] and is reflected by the hypotenuse face of each corresponding prism to the corresponding image quadrant via the second base face[33] of the prism, and onto respective individual Image Sensors[31].

Figure 6:
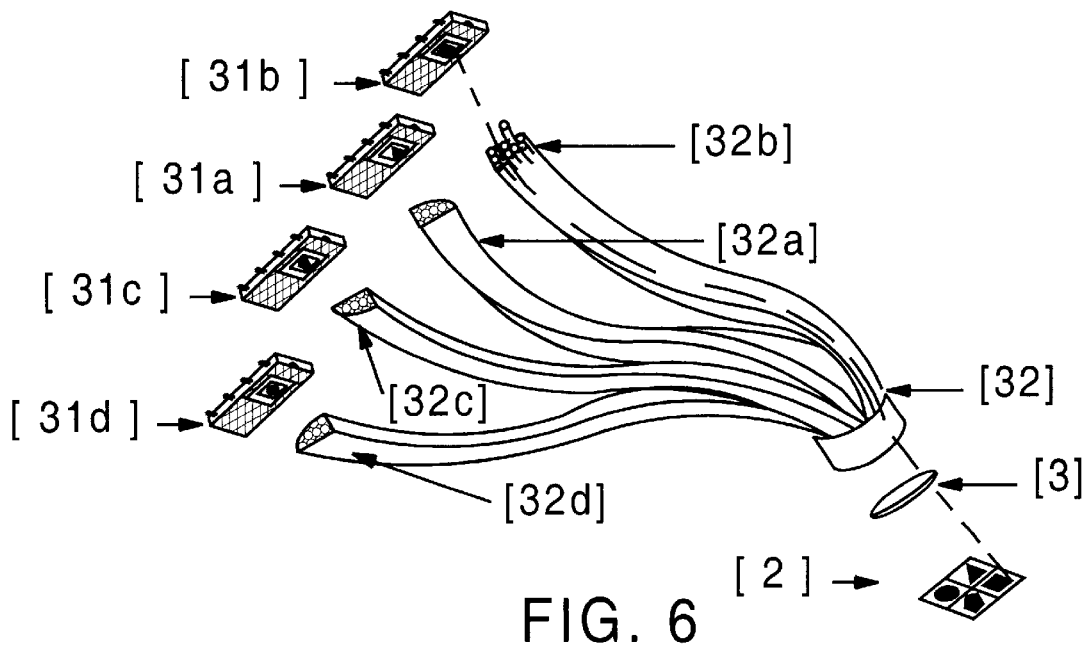
FIG. 6 depict another alternative implementation of the Image Capture Element [1]

An additional method for providing a split sensor device is shown in FIG. 6. The splitting of the image is achieved by bundling of a large number of optical fibers [32] behind the Lens System[3], and dividing of the optical fiber bundle into multiple branches[32a, b, c, and d], so that each branch conducts light from its corresponding quadrant onto the corresponding CCD Image Sensor[31a, b, c and d].

In both the above implementations a sequencing program or circuitry is needed, to reconstitute the full image data by recombining the image data from the individual CCD elements [30]. In the arrangements of FIG. 5 and FIG. 6 for example, the recombination circuit or software will attach data for each corresponding scan line from the top left Image Sensor [31a] to the top corresponding line from the right Image Sensor[31b], until all active scan lines in the respective Image Sensor[31] are exhausted, thus reconstructing the top portion of the image frame. Similarly image data is recomposed from Image Sensors[31d] and [31c], thus completing the image acquisition as if the image data was acquired by a single CCD image sensor of a larger resolution.

It should be noted that many other ways exist to split the image data, such as creating an area image sensor where the image sensitive area is close to two edges of the device, thus allowing grouping of a number of sensors in close proximity to one another, obviating the need for a separate optical splitter. Other obvious methods for optical splitting of the image include use of mirrors (e.g. instead of prisms [30]), dichroic splitters, etc. It is also apparent that while FIG. 5 and FIG. 6 depict four CCD Image Sensors[31a, 31b, 31c, and 31d], with minor changes to the optical splitter as many CCD elements as desired may be connected and their respective image signal recomposed to achieve the required resolution.

Another alternative to making the Image Capture Element [1] is placing one or more commercially available CCD Array Image Area Sensors (e.g. similar to device TC215 manufactured by Texas Instruments), on a moveable platform whose movement in one, two or three dimensions is controlled by piezo electric, magnetic, electromagnetic, electromechanical or otherwise mechanical actuators. Such a sensor could generate a single image in multiple scan passes, each scan pass capturing a different part, or interlace, of the image. The image parts may then be recombined by software or by proper placement of the separate images captured in memory so that the separate parts will create a full image. In another implementation, a line image sensor may be placed on a movable platform placed in Lens System[3] focal plane and moved linearly (e.g. in an arrangement similar to focal plane shutter in a single lens reflex camera) or pivoted to perform image scan to acquire the image.

In all the above described alternative methods for construction of the Image Capture Element [1], a color sensitive image sensor may be substituted, to allow the transmission of color facsimile.

Various methods of electronic resolution enhancement such as duplicating adjacent lines or data interpolation between pixels may be employed in order to reduce cost of manufacturing of the Image Capture element[1].

In order to reduce image distortion, a separate Lens System may be substituted for the page image capture preset setting of the fax camera, or alternatively an additional lens or lenses may be added by sliding, rotating or otherwise inserting the additional lens into the optical path between the image being captured [2] and the Image Capture Element [1].

Optionally, the display device[18] may be used as an electronic view finder, by eliminating the Shutter Device[4], or by allowing pre acquisition exposure and transferring the image from the image Capture Element [1] to the display device[18].

The Display Device[18] may also be used to edit the image prior to transmission, superimpose multiple images stored in memory, or to add text data on, or in addition to, the image. Such feature will facilitate transmitting facsimile cover pages.

It is also clear to those skilled in the art that many methods exist for constructing the Mounting Support[19], e.g. using a separate support member, not attached to the camera, or the use of a foldable and collapsible support frame, or similar common support means.

Figure 7:
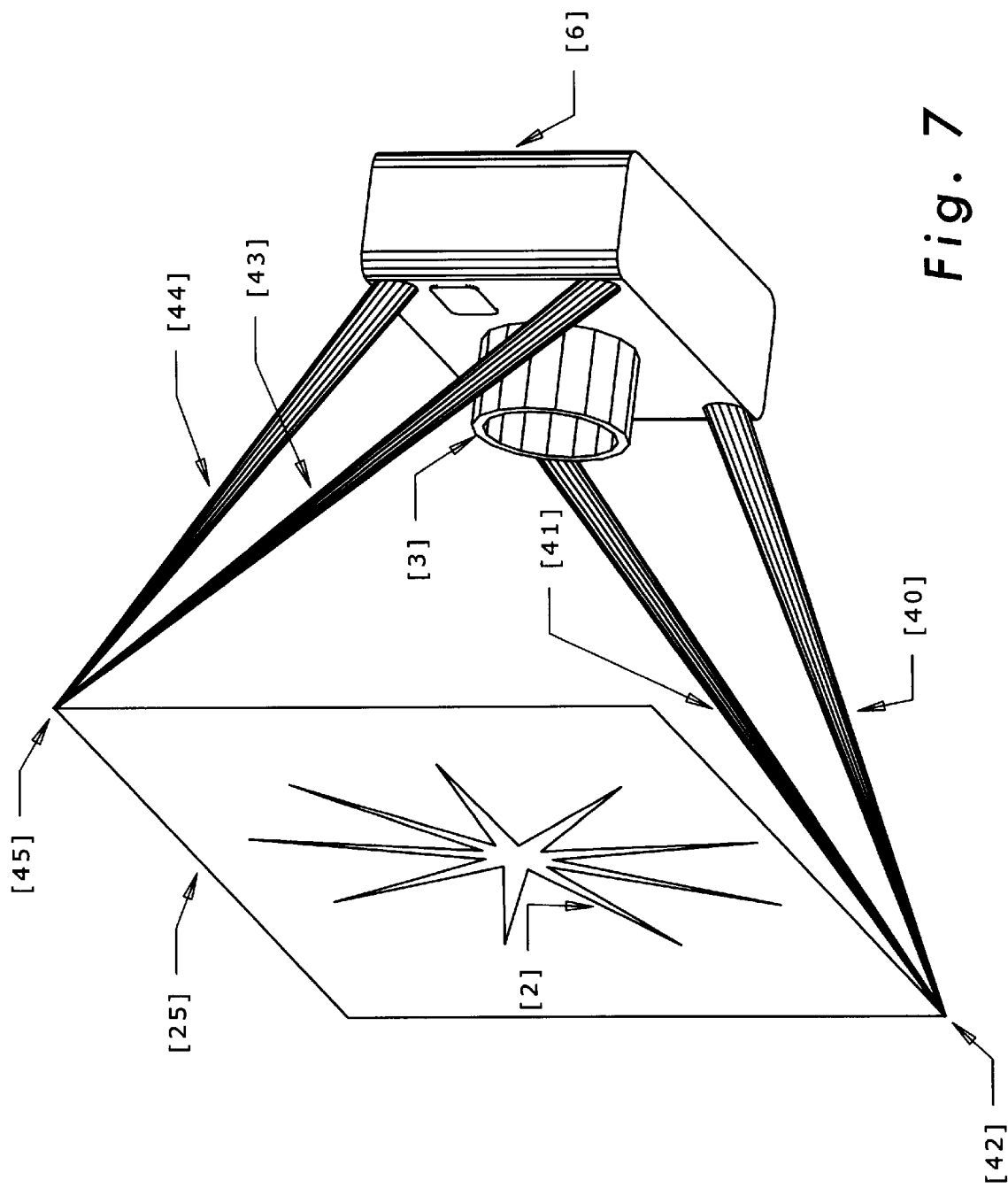
FIG. 7 shows a distance measurement and placement method as an alternative to Mounting Support[19].

The Mounting Support may be eliminated completely if desired, and its functionality replaced by focused light beams, as depicted in FIG. 7. In this implementation, light beams are focused on at least two vertices of the Virtual Frame[25]. At least two light beams are used for each vertex. The light beam emanates from the Fax Camera and is focused by a lens (not shown). The lens focal point is at a vertex of the Virtual Frame[25]. Simple geometry dictates that the two points of light [40] and [41] will converge and focus only at the vertex point[42] thus providing an easy mechanism for the user to identify the vertex location. Similarly, light beams [43] and [44] convergence point determine the second vertex of the Virtual Frame[25]. A third, similar vertex designator will be sufficient to define the Virtual Frame[25].

Yet anther method to facilitate capture of a full page image capture is placing support beams [60] supporting a sheet of paper suspended between them as depicted in FIG. 8.

Other items common in photography such as light measurement [22] means, distance measuring device[23] and automatic focus mechanism [24] may be attached to the Fax Camera device. Such additions may operate under the control of the CPU[16] or partially independently e.g. a distance measurement device that directly controls automatic focus actuator.

Whereas the present invention has been described in particular relation to the drawing attached thereto, and what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

I claim:

1. a fax camera comprising:

a) an image capture sensor mounted substantially in a focal plane of an optical focusing system, for transforming light reflected from an image into an electrical signal;

b) a memory device for storing data representing said electrical signal;

c) a facsimile signal transmission device for transmitting said electrical signal to a facsimile machine, said facsimile transmission device also capable of receiving image data from a remote facsimile machine;

d) an input device for receiving user input;

e) one or more programmable controllers for receiving input from said input device and for controlling said image capture sensor and facsimile signal transmission device; and, f) means for defining a virtual frame in predetermined distance and orientation to said image capture sensor to define a page frame for photography and transmission of an object to a remote facsimile machine.

2. The fax camera of claim 1 wherein said means for defining a virtual frame comprises mounting support constructed to support said fax camera on a surface, wherein said focusing system is substantially oriented towards said surface.

3. The fax camera of claim 2 wherein said mounting support is collapsible.

4. The fax camera of claim 1 wherein said means for defining a virtual frame comprises a page frame support device for locating a printed image at selected predetermined distance and orientation from said focusing system.

5. The fax camera of claim 1 wherein said means for defining a virtual frame comprises means for directing at least two beams of light to converge at a vertex point outside and in front of said image capture sensor, wherein a multiplicity of said vertex points define a virtual frame at a predetermined distance and orientation from said image capture sensor.

6. The fax camera of claim 1 wherein said programmable controller is adapted to selectively transmit one or more of said stored images via said facsimile transmission device.

7. The fax camera of claim 1 wherein said facsimile transmission device is adapted to receive a facsimile image from a remote facsimile device, and wherein said programmable controller is adapted to receive said facsimile image and store said image in said memory device.

8. The fax camera of claim 1 further comprising a display device constructed to operate under control of said programmable controller.

9. The fax camera of claim 8 wherein said display device is constructed to display an image stored in said memory device.

10. The fax camera of claim 9 wherein said programmable controller is constructed to display user input data superimposed on said image.

11. The fax camera of claim 1 further comprising a photographic flash device.

12. The fax camera of claim 1 wherein said image capture sensor comprises:

a) a movable image sensor for capturing successive partial images;

b) an actuator for moving said image sensor between successive partial image captures; and c) wherein said programmable controller is constructed to interleave data from said successive image captures into a single frame data.

13. The fax camera of claim 1 further comprising a digital communications port.

14. The fax camera of claim 1 wherein said image capture sensor comprises plurality of area array image sensors and an image splitting device for distributing light reflected from an image to said area array image sensors.

15. A fax camera comprising:

a) an enclosure;

b) an optical focusing system comprising one or more lens elements;

c) an image capture sensor mounted within said enclosure substantially in a focal plane of said optical focusing system for transforming light reflected from an image into an electrical signal;

d) a memory device for storing data representing said electrical signal of one or more images;

e) a facsimile signal transmission device for transmitting said electrical signal to a facsimile machine, said transmission device also capable of receiving image data from a remote facsimile machine;

f) an Input device for receiving user input;

g) one or more programmable controllers for receiving input from said input device and for controlling said image capture sensor and facsimile signal transmission device;

h) collapsible mounting support to support said fax camera on a surface, said mounting support defining a virtual frame at a predetermined distance and orientation from said image capture sensor; and i) a display device capable of displaying images and user input, and constructed to operate under the control of said programmable controller wherein said programmable controller is adapted to display image data stored in said memory device, and data entered via said input device.

16. The fax camera of claim 15 wherein said means for defining a virtual frame comprises multiple means for directing at least two beams of light to converge at a vertex point outside and in front of said image capture sensor, wherein a multiplicity of said vertex points define a virtual frame at a predetermined distance and orientation from said image capture sensor.

* * * * *